United States Patent [19]

Sekmakas et al.

[11] 4,217,261

[45] * Aug. 12, 1980

[54] AIR DRYING THERMOSETTING AQUEOUS EPOXY-ACRYLIC COPOLYMER COATING SYSTEMS

[75] Inventors: Kazys Sekmakas, Chicago; Raj Shah, Schaumburg; John D. DeRossi, Zion, all of Ill.

[73] Assignee: DeSoto, Inc., Des Plaines, Ill.

[ * ] Notice: The portion of the term of this patent subsequent to Jan. 9, 1996, has been disclaimed.

[21] Appl. No.: 1,749

[22] Filed: Jan. 8, 1979

Related U.S. Application Data

[63] Continuation-in-part of Ser. No. 752,805, Dec. 20, 1976, Pat. No. 4,133,790.

[51] Int. Cl.² ............................ C08J 3/06; C08L 33/02
[52] U.S. Cl. ................... 260/29.6 NR; 260/29.2 EP; 260/29.6 TA; 260/29.6 E; 525/109
[58] Field of Search ................. 260/29.6 NR, 29.6 H, 260/29.6 TA, 29.2 EP

[56] References Cited

U.S. PATENT DOCUMENTS

| | | | |
|---|---|---|---|
| 3,719,629 | 3/1973 | Martin et al. | 260/29.6 NR |
| 3,945,964 | 3/1976 | Hastings et al. | 260/29.6 NR |
| 3,985,698 | 10/1976 | Matsudaira et al. | 260/29.6 TA |
| 4,029,620 | 6/1977 | Chen | 260/29.6 NR |
| 4,033,920 | 7/1977 | Isozaki et al. | 260/29.6 TA |
| 4,133,790 | 1/1979 | Sekmakas et al. | 260/29.6 NR |

*Primary Examiner*—Harold D. Anderson
*Attorney, Agent, or Firm*—Dressler, Goldsmith, Shore, Sutker & Milnamow, Ltd.

[57] ABSTRACT

Thermosetting aqueous epoxy-acrylic copolymer coating systems adapted to cure on air drying are provided using a first package constituted by acid-neutralized organic solvent soluble tertiary amine copolymer comprising at least about 60% of non-reactive monoethylenic monomer, and from 15–40% of monoethylenic tertiary amine monomer, said copolymer being in solution in a watermiscible organic solvent, and a second component comprising a resinous polyepoxide in solution in at least partially water-miscible organic solvent.

9 Claims, No Drawings

AIR DRYING THERMOSETTING AQUEOUS EPOXY-ACRYLIC COPOLYMER COATING SYSTEMS

This application is a continuation-in-part of our prior application Ser. No. 752,805 filed December 20, 1976, now Pat. No. 4,133,790.

The present invention relates to thermosetting aqueous epoxy-acrylic copolymer coating systems which are adapted to cure on air drying. Such coating systems are two package systems which cure upon admixture with one another and are particularly adapted for the painting of porches and floors, including cementitious substrates.

Aqueous coating compositions of the general type under consideration are in commerce, being produced under the disclosure of U.S. Pat. No. 3,719,629 issued Mar. 6, 1973. These known compositions are not only expensive, but they exhibit poor chalking resistance, and poor tint retention. They are also marginal from the standpoints of (1) applicability to porches; (2) film hardness; and (3) cracking resistance.

In the aqueous coating compositions of said U.S. Pat. No. 3,719,629, the epoxy resin component is combined in an aqueous medium with an aminoethylated vinyl polymer having pendant aminoethyl groups, these groups having the formula:

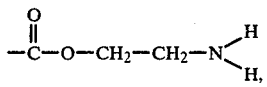

and the cure is between the oxirane (epoxy) group in the epoxy resin and the amino hydrogen atoms in the aminoethyl group pictured. In the present invention, the amino hydrogen atoms which are essential in the prior art are not present. Moreover, the production of the pendant aminoethyl groups in the prior art required the use of expensive and hazardous ethylene imine, and this is avoided in this invention.

From the broader standpoint, and in addition to the aqueous epoxy system noted previously other resin systems have been employed to provide air drying porch and floor paints. Thus, the systems of this invention are intended to replace two existing aqueous systems, one based on an alkyd resin and another based on an aqueous copolymer latex, and also to replace an organic solvent-based epoxy system. The invention exhibits significant superiority to all three as will be documented hereinafter.

A two package system is employed in the present invention. In one component is placed an acid-neutralized tertiary amine copolymer in solution in a water-miscible alcoholic solvent. The other component contains the epoxy resin, desirably together with a catalyst for the epoxy-tertiary amine reaction, in solution in organic solvent which is at least partially water-miscible, and which is preferably alcoholic. Before applying the coating, the two separately stable solution components are mixed together to form an aqueous mixture of limited pot life, and this aqueous mixture is coated upon the surface to be painted. The water which is present in the aqueous mixture is normally added to the first component prior to admixture of the two components, but all or a portion of the water can be added after the mixture is formed. The first component also desirably includes a surfactant for maintaining the epoxy resin in relatively stable emulsion in the aqueous mixture which is provided.

Typical coatings produced by the present invention have a pot life of at least about 8 hours, usually about 12–14 hours, and can be applied by roller, brush, or air spray. The applied aqueous coatings dry to the touch in air at room temperature in about 6–7 hours and become water and solvent resistant in about 8–12 days. Recoat properties are comparable to that of conventional porch and floor paints. Importantly, polymer solubility is obtained using acids like lactic or acetic acid which are less toxic than anionic systems solubilized with amines, and generally less than 10% of nonobjectionable alcoholic solvents are needed which is advantageous from several well known standpoints, such as cost, hazard, pollution, and the like.

Referring more particularly to the tertiary amine copolymers, these are organic solvent-soluble copolymers comprising two copolymerized monoethylenically unsaturated components, namely: (1) nonreactive monomer; and (2) tertiary amine monomer. While small amounts of other monomers may be present, such as monoethylenic carboxylic acids, monoethylenic amides or N-methylol derivatives thereof, or polyethylenic hydroxy-functional materials such as polyesters, these are not necessary.

The nonreactive monoethylenically unsaturated (monoethylenic) monomer should constitute at least about 60% of the copolymer in order to provide desirably physical characteristics. Styrene is the preferred nonreactive monoethylenic monomer, but vinyl toluene is also useful. Methyl methacrylate, acrylonitrile, and vinyl acetate will further illustrate the nonreactive monomers which are useful. A portion of a flexibilizing nonreactive monomer is also desirably present, such as ethyl acrylate or methacrylate or butyl acrylate or methacrylate. These flexibilizing monomers can be more generally defined as $C_2-C_{18}$ alkanol esters of monoethylenic carboxylic acids.

In preferred practice, the nonreactive monomer component will constitute from about 60% to about 85% of the weight of the tertiary amine copolymer, typically about 73%.

In our previous application, monoethylenic hydroxy-functional monomer was used in an amount of from 5–35% of the weight of the tertiary amine copolymer for various reasons. First, the hydroxy functionality assists in achieving water solubility with the aid of a solubilizing acid, but with an increased proportion of the amine monomer, this is not essential. Second, the presence of the primary hydroxy group provided by the hydroxy functional monomer helps the ultimate cure. It has now been found that with enough amine monomer, the secondary hydroxyl groups provided by the epoxy component provides a satisfactory cure. Also, sufficient reaction involving the tertiary amine group adequately couples the acrylic copolymer and the epoxy resin in the film which is formed.

The crucial component of the tertiary amine copolymer is the monoethylenic tertiary amine monomer. Typical tertiary amine monomers are dimethyl aminoethyl acrylate or methacrylate, dimethyl aminopropyl acrylate or methacrylate, diethyl aminomethyl acrylate or methacrylate, and diethyl aminoethyl or aminopropyl acrylate or methacrylate. The corresponding crotonates and tertiary amino esters of other monoethylenic carboxylic acids are also useful. Additionally, the corresponding amides are useful such as dimethyl aminoethyl methacrylamide.

The proportion of the tertiary amine monomer can vary in the same way as the hydroxy monomer, namely, from 15-40% by weight of the copolymer, preferably from 20-30% by weight.

Water miscible organic solvents which are useful in this invention are preferably alcoholic and are illustrated by ethanol, propanol, isopropanol, n-butanol, isobutanol, 2-ethoxy ethanol and 2-butoxy ethanol.

The specific nature of the solubilizing acid used to disperse the amine copolymer in water is of secondary significance. Inorganic acids, such as hydrochloric acid or sulfuric acid, are useful, though not preferred. It is presently preferred to employ phosphoric acid, glycolic acid (hydroxy acetic acid), or acetic acid, but other acids can be used, such as formic acid or carbonic acid. Propionic acid is also useful.

The solubilizing acid is used in an amount to provide a colloidal dispersion having a preferred pH in the range of pH 6.0-7.0, though a pH in the range of pH3-8 is broadly useful.

The epoxy resins which are used in this invention can be broadly referred to as resinous polyepoxides, and those which possess a 1, 2-epoxy equivalency in the range of about 1.4 to about 2.0 are preferred. Polyepoxides which are diglycidyl ethers of bisphenols are particularly preferred, especially those having an average molecular weight in the range of about 350 to 4000. A diglycidyl ether of bisphenol A having an average molecular weight of about 390 will be used to illustrate the invention.

The polyepoxide component is itself conventional, as discussed in U.S. Pat. No. 3,719,629 referred to previously.

The polyepoxide is desirably used in an amount providing approximate stoichiometry between epoxy groups in the polyepoxide and tertiary nitrogen atoms in the amine copolymer, ±50%, more preferably ±20%.

The organic solvent component of the package containing the polyepoxide is intended to provide desirably liquidity, particularly since the polyepoxide is normally a viscous liquid or a solid at room temperature. Since it is desired that the polyepoxide be stably dispersed in the aqueous mixture which is ultimately produced, the organic solvent should be at least partially water miscible, but the partial miscibility which is intended need merely be that which is consistent with the ultimate stable dispersion which is contemplated, and it is most accurate to refer to the form of the dispersion as an emulsion since the presence of the polyepoxide component in the aqueous mixture which is formed is such as to induce considerably opacity to the liquid mixture.

A surfactant is normally included in the polyepoxide solution in order to stabilize the aqueous emulsions which are formed. Appropriate surfactants may be nonionic or anionic and the selection of surfactants appropriate for the emulsification of epoxy resins in water is well known and is not a feature of this invention. Surfactants are not needed, however, since the cationic copolymer itself functions to help to maintain the epoxy resin in relatively stable emulsion.

It is also permissible to include catalysts for the tertiary amine-epoxy curing reaction. This reaction is itself well known, and thus the selection of catalysts for the reaction is not of primary concern. Appropriate catalysts are Lewis acids, such as dibutyl tin dilaurate. Indeed, no catalyst is needed, and none is used in the preferred form of the invention.

The systems of this invention can be applied clear or pigmented, but pigmented systems containing titanium dioxide rutile at a pigment to binder ratio of 0.3:1.0 are preferred.

The invention is illustrated in the following examples.

EXAMPLE I

Preparation of solvent soluble tertiary amine copolymer in solution in water miscible organic solvent 450 parts of 2-butoxy ethanol are heated to 120° C. in a reactor equipped with an agitator, a reflux condenser, a thermometer, and a nitrogen inlet tube for sparging the reaction mixture.

Monomers and catalysts are premixed in an addition tank. 900 parts of styrene, 630 parts of butyl acrylate, 560 parts of dimethyl aminoethyl methacrylate and 30 parts of azobisisobutyronitrile are thus premixed and slowly added to the reactor over a period of 3 hours. The temperature in the reactor over a period of 3 hours. The temperature in the reactor is maintained at 120° C. during the period of addition and for one hour thereafter.

To complete monomer conversion, 2 parts of azobisisobutyronitrile are added and the reaction continued for one hour at 120° C. and then 2 more parts of the same catalyst and the reaction continued for 2 additional hours at the same temperature.

The product is then cooled to about 70° C. and 250 parts of 2-butoxy ethanol are added together with 700 parts of 2-ethoxy ethanol and the final copolymer solution is filtered to provide a solution having a Gardner viscosity of $Z_1$, a Gardner-Holdt color of 1-2 and a nonvolatile solids content of 58.4%.

EXAMPLE II

Preparation of pigmented acidified copolymer aqueous solution

| Parts | Component |
|---|---|
| 223.6 | solution of Example I |
| 3 | surfactant (note 1) |
| 150 | titanium dioxide rutile |
| 50 | amorphous silica |
| 4 | Attapulgus clay |

Note 1
The surfactant utilized is the American Cyanamide product Aerosol C-61 which is a cationic surfactant. Surfactant selection is not critical.

The above is ground at high speed and then slowly add, with slow agitation, 12 parts of acetic acid. After continuing the agitation for 3 minutes, add 558.11 parts of water containing 1 part of 37% aqueous formaldehyde and 1.5 parts of a biocide. The formaldehyde and the biocide prevent the growth of mold and are optional. 1.0 part of defoamer (Drew Chemical Company L-475) may also be used, but is not necessary.

EXAMPLE III

Preparation of polyepoxide curing solution

| Parts | Component |
|---|---|
| 3.04 | Diglycidyl ether of bisphenol A having an average molecular weight of 390 |

-continued

| Parts | Component |
|---|---|
| 10.1 | 2-butoxy ethanol. |

EXAMPLE IV

Upon admixture of the solutions of Examples II and III, one obtains an aqueous emulsion which has a pot life of about 8 hours. Coating this emulsion by brushing on a concrete surface followed by air drying at room temperature for 8 hours provided a painted surface which was hard enough to be walked upon without being marred.

The advantages of the invention will be apparent from the tabulated data presented below in which X indicates a positive feature, 0 indicates a negative feature, and 1 indicates neither.

TABLE

| Property | Example IV | La-tex | Al-kyd | Two-Component Epoxy | U.S. Pat. 3,719,629 (Dow) |
|---|---|---|---|---|---|
| Water Based | X | X | | | X |
| Solvent Based | | | 0 | 0 | |
| Price | X | X | X | 0 | 0 |
| One Package | | X | X | | |
| Two Package | 0 | | | 0 | 0 |
| Ease of Clean Up | X | X | 0 | 0 | X |
| Use on Previous Paints | X | X | X | 0 | X |
| Flammable | X | X | 0 | 0 | X |
| Use on Interior | X | X | 0 | 0 | X |
| Hazardous | | | 1 | 0 | |
| Use on Porches | X | X | X | 0 | ? |
| One Coat Hide | X | 0 | 0 | X | X |
| Alkali Resistance | X | X | 0 | X | X |
| Abrasion Resistance | X | 1 | 1 | X | X |
| Chemical Resistance | X | 1 | 0 | X | X |
| Hardness | X | 0 | 0 | 1 | 1 |
| Good Adhesion | X | X | X | X | X |
| Tire Track Adhesion | X | 0 | 1 | X | X |
| Tint Retention | 1 | X | 1 | 0 | 0 |
| Chalking Resistance | 1 | X | 1 | 0 | 0 |
| Cracking Resistance | 1 | 1 | 1 | ? | ? |

We claim:

1. A method of providing a thermosetting aqueous epoxy resin-acrylic copolymer coating system adapted to cure on air drying comprising providing a mixture in water consisting essentially of a first component constituted by acid-neutralized organic solvent soluble tertiary amine copolymer of copolymerized monomers comprising at least about 60% of non-reactive monoethylenic monomer, and from 15–40% of monoethylenic tertiary amine monomer selected from the group consisting of esters and amides of monoethylenic carboxylic acids, said copolymer being in solution in a water-miscible inert organic solvent, and a second component constituted by a resinous polyepoxide in solution in at least partially water-miscible organic solvent.

2. A thermosetting aqueous coating system as recited in claim 1 in which the polyepoxide is used in an amount providing approximate stoichiometry between epoxy groups in the polyepoxide and tertiary nitrogen atoms in the amine copolymer ±50%.

3. A thermosetting aqueous coating system as recited in claim 1 in which said water miscible organic solvent is alcoholic.

4. A thermosetting aqueous coating system as recited in claim 1 in which said amine copolymer consists essentially of from about 60% to about 85% of said nonreactive monomer, and from 20–30% of said tertiary amine monomer.

5. A thermosetting aqueous coating system as recited in claim 4 in which said tertiary amine monomer is a dimethyl or diethyl amino alkyl acrylate, methacrylate, acrylamide or methacrylamide.

6. A thermosetting aqueous coating system as recited in claim 1 in which said component containing said polyepoxide includes a surfactant for emulsifying said polyepoxide in water.

7. A thermosetting aqueous epoxy resin-acrylic copolymer coating composition consisting essentially of water having dissolved therein an acid-neutralized organic solvent soluble tertiary amine copolymer of copolymerized monomers comprising at least about 60% of nonreactive monoethylenic monomer, and from 15–40% of monoethylenic tertiary amine monomer selected from the group consisting of esters and amides of monoethylenic carboxylic acids, said water further having emulsified therein with the aid of a surfactant a resinous polyepoxide.

8. A thermosetting aqueous composition as recited in claim 7 in which said resinous polyepoxide is a diglycidyl ether of a bisphenol having an average molecular weight in the range of 350–4000.

9. A thermosetting aqueous epoxy resin-acrylic copolymer coating mixture which cures on air drying consisting essentially of an aqueous mixture constituted by an acid-neutralized organic solvent soluble tertiary amine copolymer of copolymerized monomers comprising at least about 40% of nonreactive monoethylenic monomer, and from 15–40% of monoethylenic tertiary amine monomer selected from the group consisting of esters and amides of monoethylenic carboxylic acids, said copolymer being in solution in a mixture of water and a water-miscible inert organic solvent, and a resinous polyepoxide in solution in at least partially water-miscible inert organic solvent emulsified in said copolymer solution.

* * * * *